INVENTOR.
JOHAN A. LOUW

BY FOWLER, KNOBBE
& GAMBRELL
ATTORNEYS.

J. A. LOUW 3,440,146

DESALINATION METHOD AND APPARATUS WITH PLURAL VAPORIZATION
CHAMBERS CONTAINING SHALLOW LAYERS OF LIQUID

Filed May 2, 1966

INVENTOR.
JOHAN A. LOUW

BY
FOWLER, KNOBBE
& GAMBRELL
ATTORNEYS.

3,440,146
DESALINATION METHOD AND APPARATUS WITH PLURAL VAPORIZATION CHAMBERS CONTAINING SHALLOW LAYERS OF LIQUID
Johan A. Louw, 3127 Garnet Lane,
Orange, Calif. 92667
Filed May 2, 1966, Ser. No. 546,674
Int. Cl. C02b 1/08; B01d 3/10, 1/26
U.S. Cl. 203—11       24 Claims

ABSTRACT OF THE DISCLOSURE

A desalination method and apparatus includes a plurality of series-connected heat exchangers each including an evaporation chamber and a condensation chamber. A plurality of spaced-apart heat-conductive members extend into the evaporation chamber through the major portion of the depth of a shallow horizontal layer of saline water in the chamber. The pressure of the condensing vapor and the saline water in relation to the depth of the saline water layer is regulated so that the major portion of the surface of each heat-conductive member is in contact with boiling water.

In one embodiment of the invention the saline water flows in two loops through the heat exchangers and toward a common recovery location, the pressures in the loops being regulated so that the water in one loop boils at above the feed water temperature, and the water in the other loop boils at below the feed water temperature. The temperature of the condensate recovered and the temperature of the spent brine discharged are close to the temperature of the water fed to the system to substantially eliminate the addition or extraction of heat to or from the system. A heat pump is used to transfer heat within the system.

The entire desalination plant is mounted on a floating barge and the saline feed water, fresh water condensate, and concentrated brine are contained in floating tanks the heights of which are adjustable for regulating pressures within the system.

This invention relates to methods and apparatus for desalinating water, and, more particularly, to a method and apparatus for distilling sea water.

With the expanding world population, the need for fresh water is increasing at a tremendous rate. Available sources of fresh water are already grossly inadequate in many areas, and they will become inadequate in other areas in the future. As many of these areas are near oceans, sea water is becoming increasingly important as a potential source of fresh water. The major obstacle to converting sea water to potable water on a large scale has been the cost of installing a plant and providing the energy to operate it.

In most distillation processes that have been proposed, the generation of heat energy is the major factor. The need for inexpensive sources of heat energy has naturally focused attention on solar energy. However, the capital costs of solar energy plants are very high, and solar energy generally is not practical for large volume desalination projects. In another direction, considerable effort has been devoted to harnessing nuclear energy to produce large quantities of heat. Not only have the costs been prohibitive to date, but the general public's fear of having nuclear devices near residential areas and beaches has hindered further development in this direction.

For the foregoing reasons, the principal object of this invention is to provide a novel distillation method and apparatus for converting sea water to fresh water which does not require high initial plant expenditures and large quantities of energy or run counter to the public's view of safe heating installations.

This invention takes advantage of the relatively high rate of heat transfer from metal to boiling water as opposed to that from metal to non-boiling water. The size of the heat transfer apparatus can be greatly reduced by always transferring heat to boiling water.

Accordingly, a desalination apparatus constructed in accordance with this invention includes a saline water chamber separated from a vapor ocndensing chamber by a specially designed wall which includes a plurality of spaced-apart heat conductive members extending interior of the saline water chamber and through the major portion of the depth of the saline water for transferring the heat of condensation to the saline water. The pressures in the chambers are regulated to control the condensing and boiling temperatures of the vapor and saline water so that the major portion of the heat transfer surface is in contact with boiling water.

In the exemplary embodiment of the invention, the saline water in each evaporation chamber is in a rather shallow layer so that the boiling point of the water varies only slightly from the bottom of the layer to the top. By this means, the entire layer of water can be boiled with a minimum temperature difference between the condensing vapor and the water at the top of the layer.

One embodiment of this invention is particularly suited to the use of a heat pump for transferring heat energy from the cold end of the system to the hot end. In this embodiment the fresh water and brine are discharged at temperatures close to the ambient sea water temperature, thereby minimizing or substantially eliminating the need to add heat from an external source, and emphasizing transfer of heat within the system rather than introducing large quantities externally. Even if the driver of the heat pump compressor is only twenty percent efficient, if the heat pump has a coefficient of performance (ratio of energy transferred to energy used) of ten, it achieves twice the effect of direct heating. Thus, substantial economy is obtained by judiciously structuring the heat balance in conjunction with the use of a heat pump.

The present invention is particularly attractive because it can be operated at a low temperature in comparison to the temperatures used by most commercial distillation processes of the prior art. For example, the operating temperature of the heat exchanger in the hottest stage can be kept around 50° C. or lower. Low operating temperatures offer many advantages, not the least of which are reduced insulating problems, and use of less expensive materials such as thermo-plastics. Low temperatures also substantially reduce scaling which has been a serious problem in many prior art distillation processes.

Moreover, the desalination method and apparatus of this invention are adaptable to incorporation in a floating barge which can be anchored off-shore. This offers many advantages such as eliminating the cost of purchasing land or building an artificial island, and permitting easy mobility of the plant.

These and other features, objects and advantages of this invention will be apparent from the following detailed description when read with reference to the accompanying drawings in which.

Figure 1:
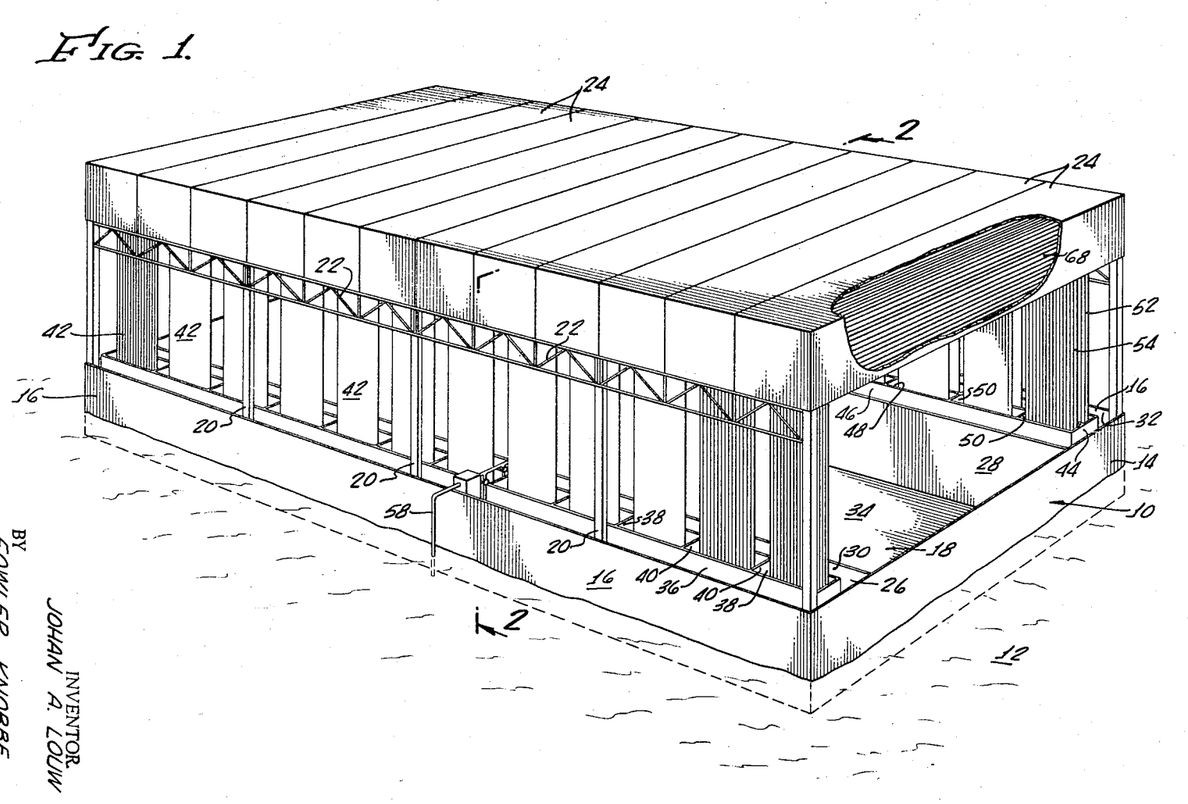
FIG. 1 is a perspective view of a floating desalination plant constructed in accordance with this invention.
Figure 2:
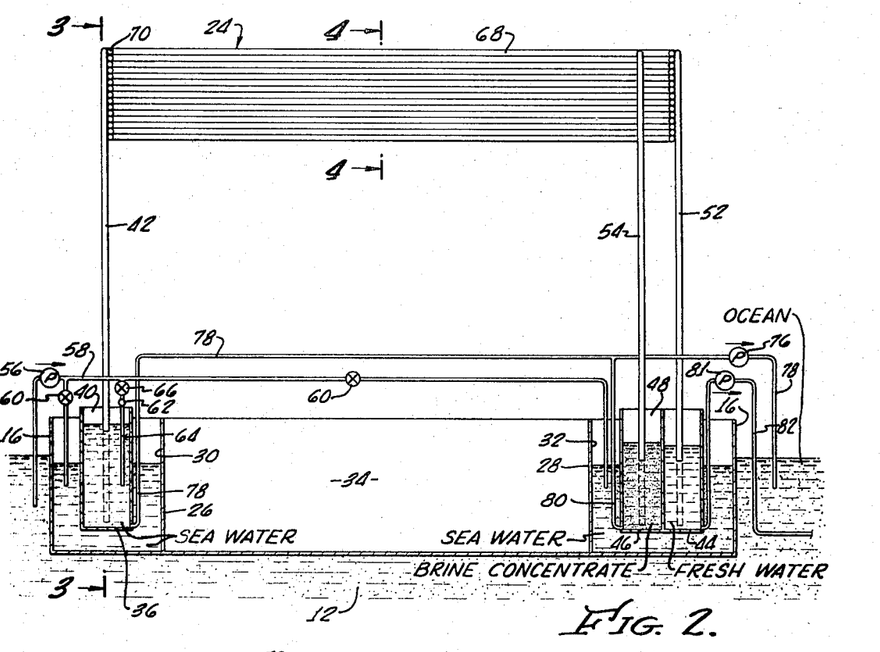
FIG. 2 is a section through the plant taken generally along lines 2—2 of FIG. 1 with some of the structural and housing portions omitted for clarity.
Figure 3:
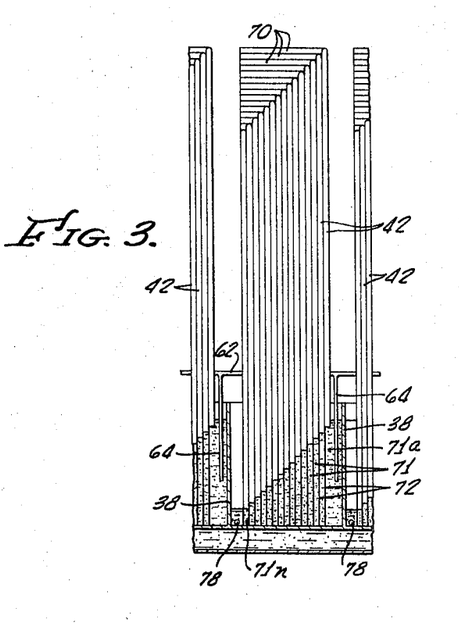
FIG. 3 is a partial vertical section taken generally along line 3—3 of FIG. 2 to illustrate particularly the sea water feed arrangement.

Referring to FIGS. 1–3 of the drawings, an exemplary desalination plant constructed in accordance with this invention includes a large buoyant shell or barge 10 adapted to float in the sea or body of water 12 which feeds the desalination plant. The shell 10 includes two end walls 14, two side walls 16, and a bottom 18 defining a large rectangular interior area. Columns 20 extending upward from the shell 10 are interconnected at their tops by trusses or girders 22 which support a plurality of desalination modules 24 extending across the width of the shell.

Two longitudinal partitions 26, 28 divide the interior area of the shell into a feed section 30 along one side, a discharge setcion 32 along the other side, and a relatively wide intermediate section 34. The feed section 30 is partially filled with sea water and has a long buoyant feed tank 36 floating in it. The feed tank 36, which extends substantially along the entire length of the shell 10, is subdivided by transverse partitions 38 into a plurality of feed compartments 40. Sea water partially fills each of the feed compartments 40 and is fed to one of the desalination modules 24 through a plurality of feed risers 42.

The discharge section 32 is also partially filled with water and has a buoyant condensate discharge tank 44 and a buoyant brine discharge tank 46 floating therein. In the exemplary plant illustrated, the condensate tank 44 and brine tank 46 are fixed together to float at the same height, although in some instances separate tanks are preferred. Transverse partitions 50 sub-divide each of the discharge tanks 44 and 46 into a plurality of discharge compartments, each compartment 48 being associated with one of the desalination modules 24. Condensate discharge risers 52 and brine discharge risers 54 extending from each module 24 into its associated compartment 48 respectively discharge condensate and brine from each module to its compartment.

The elevation of the tanks 36, 44 and 46 relative to the module 24 is adjusted by varying the water level in the feed 30 and discharge 32 sections. This is accomplished by using a pump 56 to feed sea water into or out of the sections through pipes 58. Valves 60 in the pipe system permit selective filling or emptying of one section or the other as desired.

Sea water is fed to the feed compartments 40 through a lower manifold 62 which extends along the length of the buoyant feed tank 36 and down pipes 64 which extend into each compartment 40. A master valve 66 controls flow to the manifold 62.

Figure 4:
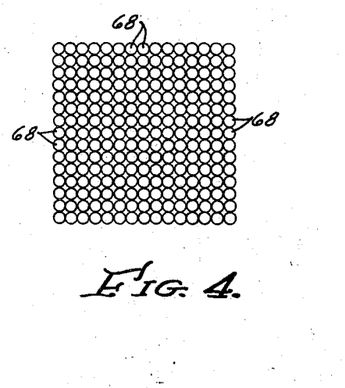
FIG. 4 is an enlarged cross section through one module of the desalination plant taken generally along line 4—4 of FIG. 2.

Referring now to FIGS. 2–4, each module 24 includes a plurality of desalination elements 68, e.g., fifteen horizontal layers of fifteen elements each in the example illustrated. A plurality of upper manifolds 70 each feed sea water from an individual riser 42 to all the elements 68 in a single horizontal row of a module. Walls 72 divide each feed compartment 40 into a plurality of subcompartments 71, one for each riser drawing from that compartment. The walls 72 defining the sub-compartments are graduated in height to maintain an equal difference in elevation between the water levels in each subcompartment 71 and the horizontal layer of elements 68 which is fed from it. The water is supplied to the deepest subcompartment 71a by the down pipe 64 and spills over into the successively shallower subcompartments 71 as the deeper subcompartments fill. The overflow from the shallowest subcompartment 71n is discharged and returned to the sea by a pipe 78 through the operation of a pump 76.

The brine and condensate tanks 46 and 44 are similarly divided into subcompartments of graduated depth. Brine is removed from the brine tank 46 and returned to the sea through a pipe 80 connected between the shallowest subcompartment and the pipe 78. The fresh water condensate is removed from the condensate tank 44 by a pump 81 connected to its shallowest subcompartment and flows ashore through a suitable conduit 82.

Now referring to the single element depicted in FIGS. 5–8, each element 68 can be observed to have a long cylindrical outer housing 83 divided into a plurality of heat exchangers 84a, 84b, 84c . . . 84n by insulating vertical walls 85. Each of the heat exchangers 84 includes a horizontal, longitudinal partition 87 received in grooves 89 in the interior wall of the housing which divides the heat exchanger into an upper evaporation chamber 86 and a lower condensation chamber 88.

A plurality of laterally spaced upstanding metal ribs 90 which are integral with the horizontal partition 87 extend substantially along the length of the heat exchanger. The ribs 90 terminate slightly short of the end walls 85 on each end of a heat exchanger so that all of the liquid in the chamber 86 is in fluid communication even though it may not flow over the upper tip 90a of the ribs 90. A plurality of elongate laterally spaced metal ribs 92 which are similar in construction to the ribs 90, depend from the partition 87 into the condenaste chamber 88. The upper ribs 90 provide increased heat transfer surface area for transferring heat to the sea water, and the lower ribs 92 do the same for transferring heat from the condensing vapor. As the coefficient of heat transfer from vapor to metal is much higher than that of metal to water, the ribs 92 in the condensation chambers can be shorter than the ribs 90 in the evaporation chamber to provide comparable heat transfer.

In some applications it is more economical to use an accordian-folded sheet of metal or even polytetrafluoroethylene as the horizontal divider so that the folds act as the heat transfer ribs. The sheet can be quite thin because the pressure differential between the evaporation chamber and condensation chamber of each exchanger is kept small.

Figure 9:
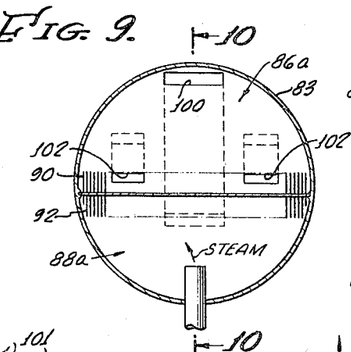
FIG. 9 is an enlarged vertical cross section, taken generally along line 9—9 of FIG. 5, showing the internal structure of the high temperature or initial heat exchanger.
Figure 10:
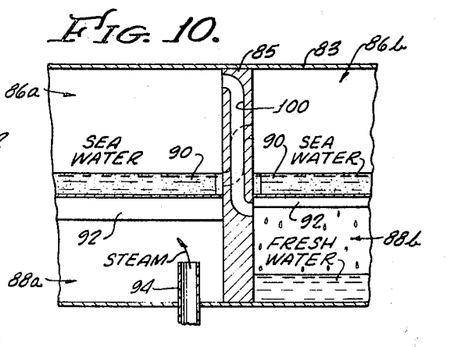
FIG. 10 is a partial longitudinal section taken generally along line 10—10 of FIG. 9, showing the internal structure of parts of the first two high temperature heat exchangers and the connection between them.

The operating temperatures of the heat exchangers 84 are graduated with the highest temperature exchanger 84a at the feed end and the lowest operating temperature exchanger 84n at the terminal or discharge end. Feed riser 42 feeds sea water to the upper or brine evaporation chamber 86a of the high temperature heat exchanger 84a. The sea water is boiled therein by a suitable external heat source, for example low pressure steam generated in a boiler (not shown) and circulated through a steam conduit 94, the lower chamber 88a, and condensate return conduit 96 (see FIGS. 5, 9 and 10). In the exemplary embodiment illustrated, the feed sea water is preheated in the riser by a supplemental heat exchanger 99 which surrounds the riser.

Figure 5:
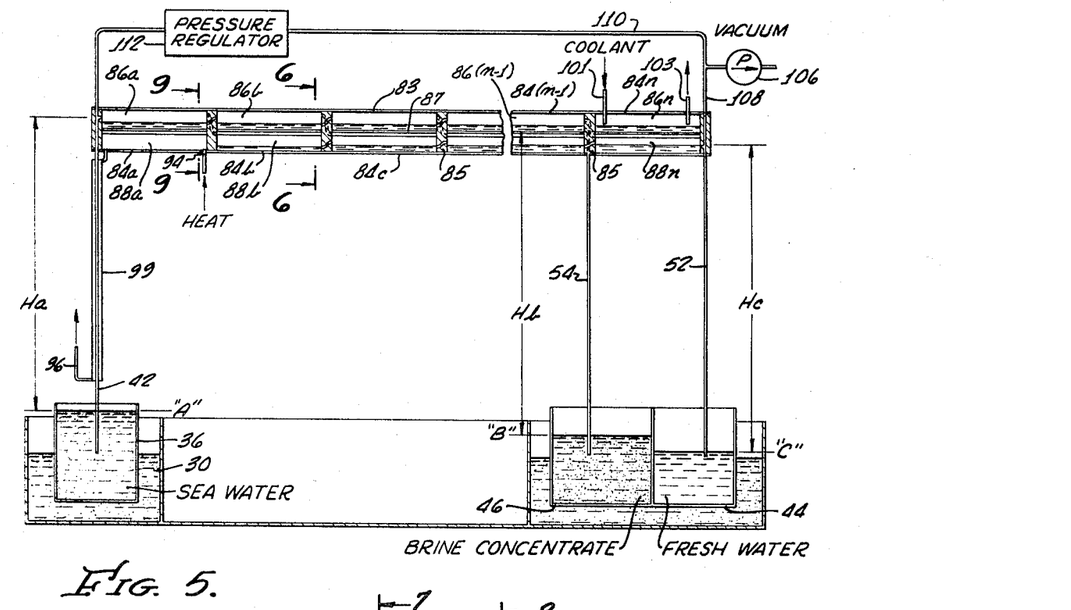
FIG. 5 is a schematic type illustration of one of the desalination elements of the plant shown in FIG. 1.
Figure 6:
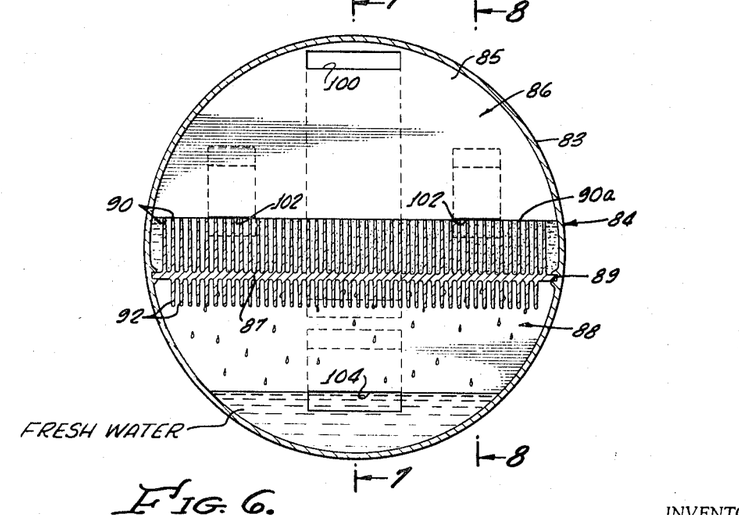
FIG. 6 is an enlarged vertical cross section taken generally along line 6—6 of FIG. 5 to show the internal structure of a typical intermediate heat exchanger.

The water vapor from the high temperature evaporation chamber 86a moves into the fresh water condensation chamber 88b of the next heat exchanger 84b through an open conduit 100 which joins chambers 86a and 88b and maintains the pressure in the two chambers about equal. A pair of conduits 102 joint the brine chamber 86a of the high temperature heat exchanger 84a to the brine chamber 86b of the next heat exchanger, and the unevaporated portion of the brine flows through the conduits 102. Inasmuch as the pressure in brine chamber 86b is lower than in brine chamber 86a, as will be described more fully hereinafter, the vapor condensing in chamber 88b will cause the brine in chamber 86b to boil at a lower temperature than required for the brine chamber 86a.

The water vapor entering the condensation chamber 88b from 86a contacts the heat exchange ribs 92 on the underside of the horizontal divider 87 and condenses. In doing so, it transfers heat through the ribs 92 and 90 to the brine in the evaporation chamber 86b immediately above it. This, in turn, causes the brine to boil.

Figure 11:
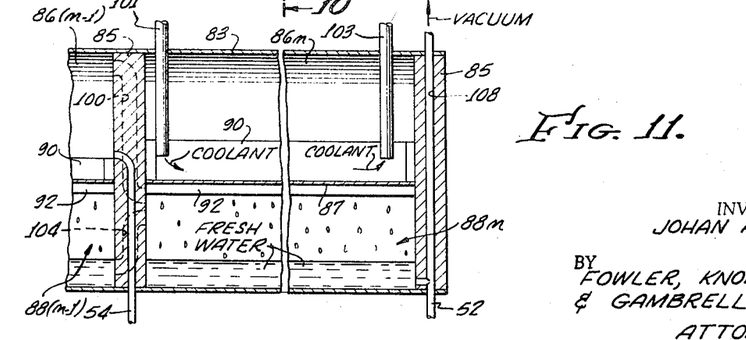
FIG. 11 is a longitudinal section through the two lowest temperature heat exchangers showing their internal structures.

Similarly, the water vapor boiled off in each subsequent brine evaporation chamber 86b . . . 86(n–1) flows into the condensation chamber of the next heat exchanger in the series where it condenses. The heat liberated by condensation is transferred by ribs 90, 92 to the brine in the contiguous evaporator chamber and the unevaporated brine flows to the next brine chamber through conduits 102. This process continues through the series of heat exchangers until the concentrated or spent brine flows out of the last brine chamber 86(n–1) through riser 54. The water vapor from the last brine chamber 86(n–1) is conducted into the condensation chamber 88n of the lowest temperature heat exchanger 84n where it is condensed by suitable coolant such as sea water circulated from a supply conduit 101 through the upper chamber 86n and out conduit 103 (see FIGS. 5 and 11).

The fresh water condensate flows toward the lower temperature side (to the right in FIG. 5) through the connecting conduits 104. It is removed from the last condensation chamber 88n by way of riser 52.

A vacuum pump 106 partially evacuates the condensate riser 52 and the feed riser 42 through conduits 108, 110, respectively. A pressure regulator 112 in the conduit 110 maintains the pressure in the condensate riser 52 substantially lower than in the feed riser. Thus, there is a substantially pressure drop between the highest temperature brine chamber 86a and the lowest temperature condensation chamber 88n. This pressure drop is distributed among the heat exchangers by virtue of the outlet 114 (see FIG. 8) of each brine conduit 102 being elevated with respect to its inlet 116. The amount of elevation is carefully selected to maintain the desired pressure distribution. Therefore, the pressures in the brine chambers 86a–n are stepped from the highest pressure in the highest temperature brine chamber 86a to the lower pressure in the brine chamber 86(n–1) of the second lowest temperature heat exchanger. It will be recalled that chamber 86(n–1) is at the same pressure as the last condensation chamber 88n.

The outlet 118 of each condensate conduit 104 is also elevated with respect to its inlet 120 to balance and distribute the pressure difference between adjacent condensate chambers 88a–88n.

Additional vacuum lines (not shown) can be tapped off the conduit 110 to each brine chamber 86 through separate pressure regulators to remove uncondensable gases and assure proper pressure distribution.

Still referring to FIG. 5, the pressue in the evaporation chamber 86a of the first heat exchanger is substantially below atmospheric pressure. This partial vacuum is compensated for by the height Ha of the water column between the water level A in subcompartment 71 feeding the riser 42 and the first heat exchanger 84a. As was described above, the height Ha of this water column is adjustable by adjusting the level of water in the feed section 30 which adjusts the height of the buoyant feed tank 36 relative to the elements therein. Similarly, the partial vacuum of the second last evaporation chamber 86n–1 and of the last condensation chamber 88n is balanced by the heights Hb, Hc of the liquid column in the brine riser 54 and condensate riser 52 respectively.

Figure 12:
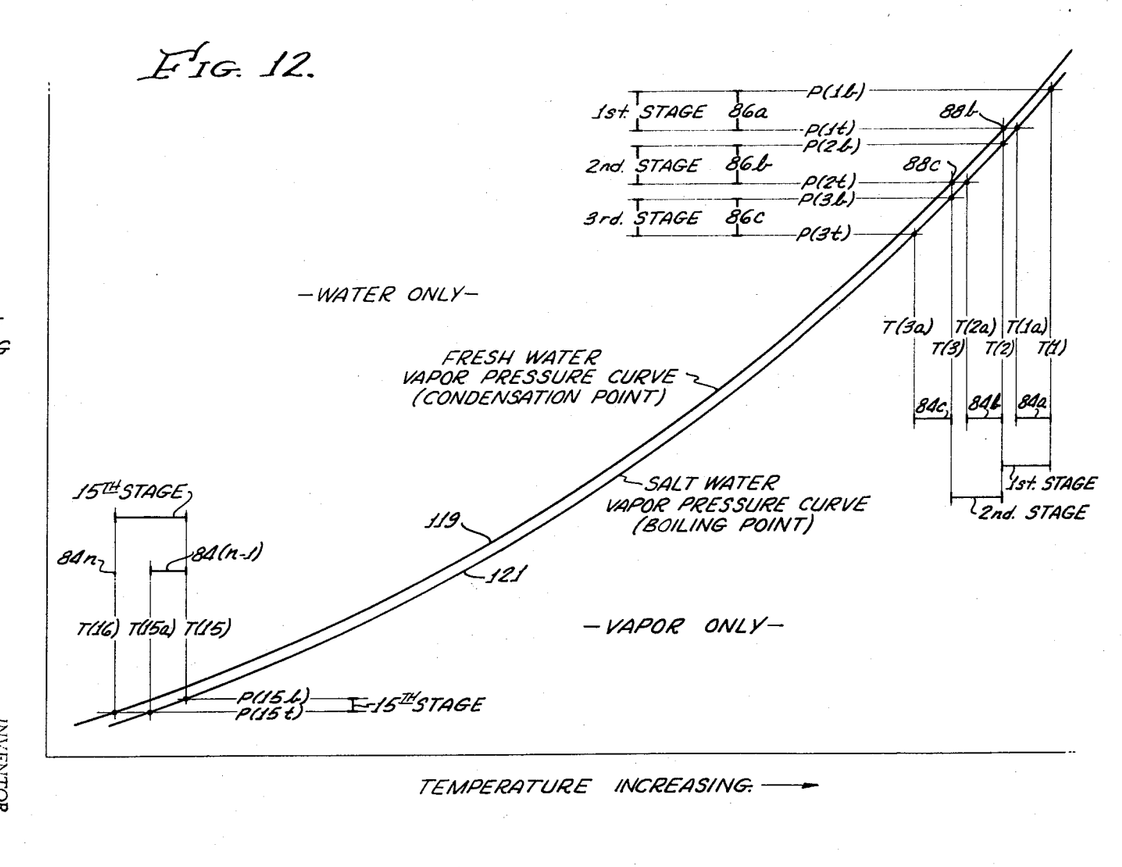
FIG. 12 is a graphical representation of the fresh water and brine vapor pressure curves showing the pressures and temperatures of the exemplary desalination process.

In FIG. 12 an exemplary fresh water vapor pressure curve 119 is plotted to show the temperatures and pressures at which fresh water boils and condenses. Above the curve 119 water will be liquid and below the curve 119 it will be vapor. Similarly, a salt water vapor pressure curve 121 is plotted showing the boiling points of an exemplary brine. The salt water vapor pressure curve 121 reflects the increased salinity as the brine becomes more concentrated during the desalination process (moving from right to left in FIG. 12).

Sea water enters the evaporation chamber 86a of the high temperature heat exchanger 84a at about temperature $T(1a)$ which is above the temperature of the ambient sea water 12 because the feed water has been preheated in the auxiliary heat exchanger 99. Preferably, however, $T(1a)$ is less than about 50° C. in order to reduce such problems as scaling which are accentuated at high temperatures.

The evaporation chamber of the high temperature heat exchanger 84a is partially evacuated so that the upper surface of the relatively shallow layer of sea water in the first evaporation chamber 86a is maintained at a corresponding pressure of about $P(1t)$ and the bottom of the layer of sea water is at a higher pressure of about $P(1b)$. Thus, the sea water in the first heat exchanger 84a is at about its saturated vapor pressure. The steam in the high temperature heat exchanger 84a is condensed at a temperature above $T(1)$ so that substantially the entire layer of brine is boiling. This increases the efficiency of the heat transfer since the coefficient of heat transfer from metal to boiling water is considerably greater than that for heat transfer from metal to nonboiling water.

The evaporation chamber of the second heat exchanger 84b includes a relatively shallow layer of brine conducted from the first evaporation chamber 86a. The pressure in the second evaporation chamber 86b is even lower than in the first by virtue of the head of water in the brine conduit 102. Thus, the top of the layer is at about pressure $P(2t)$ and the bottom is at a higher pressure of about $P(2b)$. Therefore, the brine in the chamber 86b will flash and cool to about temperature $T(2a)$ (corresponding to pressure $P(2t)$) upon entering the second heat exchanger. The amount of evaporation resulting from the flashing is negligible for purposes of this process because of the small pressure difference.

As water vapor boils off of the sea water in the first heat exchanger 84a, it leaves its evaporation chamber 86a at about pressure $P(1t)$ and a temperature somewhere between temperature $T(1)$ and $T(1a)$. It enters the fresh water condensation chamber 88b of the second heat exchanger 84b where it condenses at temperature $T(2)$, the pressure in that condensate chamber being maintained at pressure $P(1t)$ as it is in open connection with the first evaporation chamber.

Thus, the vapor from the first heat exchanger 84a is condensing at a sufficiently high temperature T(2) to boil substantially the entire layer of brine in the second heat exchanger 84b, again achieving the efficiency of heat transfer to a boiling liquid.

Similarly, the vapor from the second evaporation chamber 86b will enter the condensation chamber 88c of the third heat exchanger 84c at pressure P(2t) and temperature between T(2) and T(2a). This vapor will condense at temperature T(3) and in turn boil the shallow layer of brine in the third heat exchanger 84c wherein the pressure is less than P(3b).

This staggered process is repeated through the entire series of heat exchangers, each brine evaporation chamber 86 together with the condensation chamber 88 of the next heat exchanger comprising a stage in which water is evaporated and recondensed. By way of example, a single element might have fifteen stages, thereby using sixteen heat exchangers. Thus, vapor leaves the second to last or fifteenth heat exchanger 84(n-1) and enters the lowest temperature heat exchanger between T(15a) and T(15). The vapor condenses in the low temperature heat exchanger 84n at temperature T(16). The heat given off by this condensation is absorbed by the coolant in the upper chamber 86n of the heat exchanger 84n. If sea water is used as the coolant, preferably the temperature T(16) should be above the temperature of the ambient sea water but as close thereto as economically feasible.

By way of example, the graph of FIG. 12 is illustrated using a uniform temperature increment between the boiling temperature at the bottom of the layer and at the top of the layer in each brine chamber. Therefore, as is evident from the graph, the pressure differential between the top and bottom of the brine layer must be much less at the low temperature end than at the high temperature end. Thus, the evaporation chambers are arranged so that the water depth decreases from the high temperature end to the low temperature end.

The number of stages and the capacity of each element 68 decreases as the temperature range within each stage, and therefore the difference between the mean temperature of adjacent stages, increases. On the other hand, the use of a large temperature differential decreases the area of heat transfer surface needed. In each installation these competing goals must be balanced to achieve the optimum economy.

As is apparent from the graph of FIG. 12, the temperature range within any stage varies with the depth of the water in the brine chamber 86. Therefore, it is preferable to maintain the layer of water in each brine chamber 86 relatively shallow, no deeper than six inches, and preferably less than two inches deep. Moreover, at the very least, the major portion of the surface of ribs 90 should be in contact with boiling water and the ribs should extend through the major portion of the depth of the water layer. Preferably, the ribs 90 should be substantially coextensive with the depth of the layer of saline water, and substantially the entire depth of water should be boiling.

Figure 13:
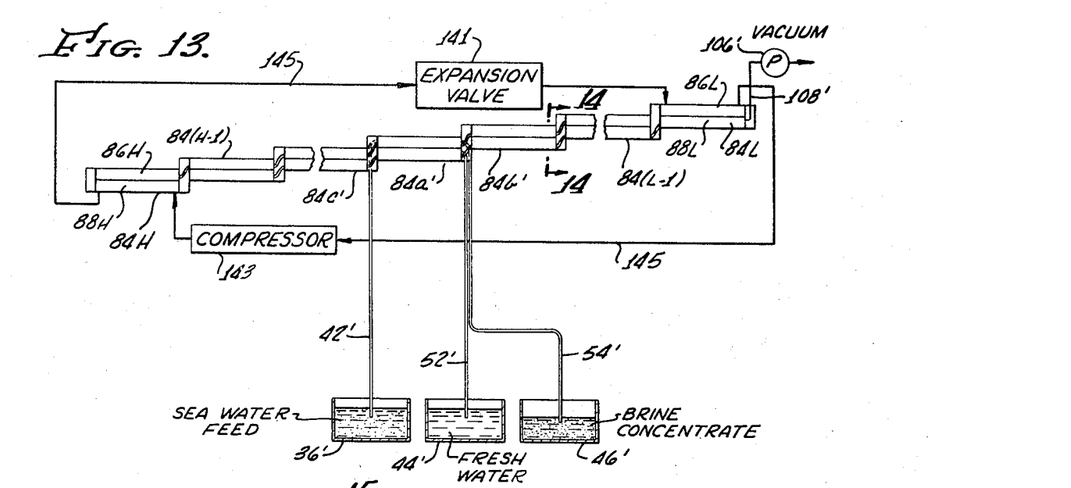
FIG. 13 is a schematic illustration of a modified element for use in a desalination plant constructed in accordance with this invention.
Figure 14:
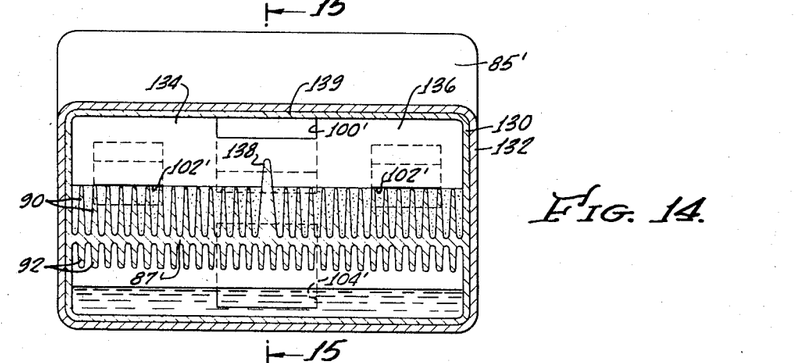
FIG. 14 is an enlarged vertical cross section taken generally along line 14—14 of FIG. 13 showing the internal structure of a typical intermediate heat exchanger of the modified element of FIG. 13.
Figure 15:
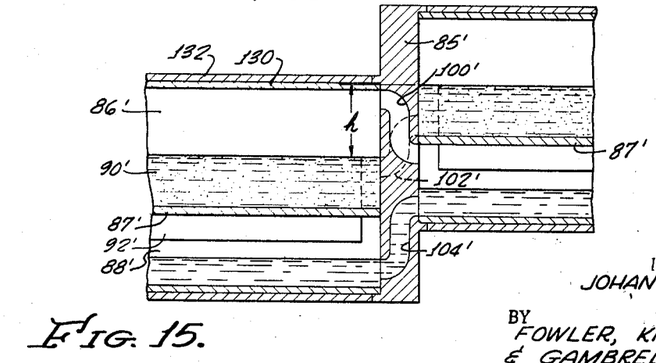
FIG. 15 is a partial longitudinal section taken generally along line 15—15 of FIG. 14 showing the internal structure of the intermediate heat exchangers of the modified element of FIG. 13 and the connection between them.

Referring now to FIGS. 13–15, another embodiment of the desalination elements is shown. In this embodiment the sea water feed riser 42', the brine discharge riser 54', and the condensate riser 52' are all disposed near the middle of the element 68' to supply to and feed from a heat exchanger 84a' near the middle of the series.

As shown in FIGS. 14 and 15, an exemplary intermediate heat exchanger in this embodiment has a rectangular outer housing 130 which is covered by insulating material 132. Each heat exchanger 84' includes a horizontal partition 87' and upstanding 90' and depending 92' heat exchange ribs generally similar to those of the embodiment of FIG. 5. However, a relatively high upstanding divider rib 138, which terminates below the upper wall 139 of the housing 130, divides the brine chamber 86' into a brine feed subchamber 134 and a brine return subchamber 136. It is to be understood that in some instances separate pipes may be employed for the brine feed and brine return.

Referring to FIG. 13 as well as to FIGS. 14 and 15, the brine from the feed riser 42' enters the brine feed subchambers 134 of the initial heat exchangers 84a' and 84c', from where it flows in both directions toward the lowest temperature exchanger 84L and the highest temperature exchanger 84H through inter-connecting conduits 102'. At each of the extreme temperature brine chambers 86L and 86H, the brine passes from the brine feed subchamber 134 to the brine return subchamber 136 and then flows from one return subchamber 136 to the next until it reaches the final return subchamber which is connected to the brine removal riser 54'. The brine concentrate is then removed from the system in the same manner as shown in FIGS. 1–5.

The condensate is conducted from each condensate chamber 88' toward the central condensate riser 52' where is is recovered. The water vapor from each evaporation chamber 86' flows to the fresh water condensation chamber 88' of the next lower temperature heat exchanger through a vapor conduit 100'. Thus, the brine circulates in two loops from the central feed riser 42' toward the end heat exchangers 84L and 84H and back to the central brine riser 54', the water vapor always moves to the right in FIG. 13, and the condensate always flows toward the central condensate riser 52'.

The evaporation chamber 86' of each heat exchanger except the lowest temperature one 84L is a brine evaporation chamber in which saline water is boiled. The condensation chamber of each heat exchanger, except for the high temperature exchanger 84H, is a fresh water condensation chamber in which water vapor is condensed.

A refrigeration system or heat pump includes an expansion valve 141, a compressor 143, an evaporator 86L, which is also the evaporation chamber of the lowest temperature heat exchanger 84L, and a condenser 88H which is the condensation chamber of the high temperature heat exchanger 84H. The components of the heat pump are appropriately interconnected by conduits 145 so that the system's refrigerant absorbs heat from the condensate in the condensation chamber 88L of the low temperature heat exchanger and transfers the absorbed heat to sea water in the evaporation chamber 86H of the high temperature heat exchanger.

Figure 7:
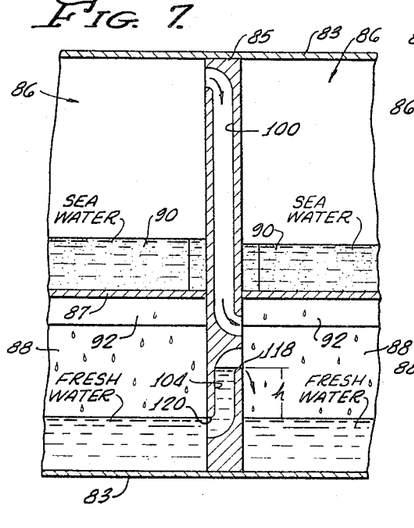
FIG. 7 is a partial longitudinal section taken generally along line 7—7 of FIG. 6 to show the internal structure of the intermediate heat exchangers and the connections between them.
Figure 8:
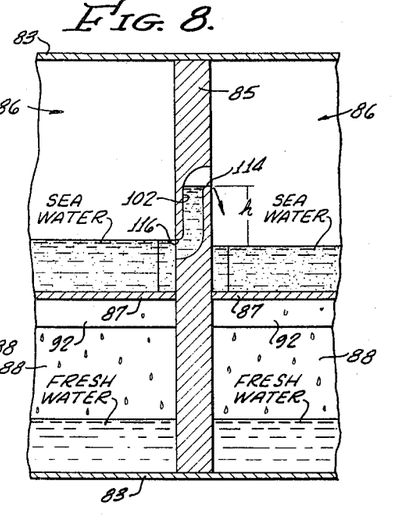
FIG. 8 is a partial longitudinal section similar to FIG. 7 taken generally along line 8—8 of FIG. 6.

In this embodiment, the differential pressure between the adjacent brine chambers 86' and between adjacent condensate chambers 88' is maintained by disposing each heat exchanger at a different level to maintain a water head $h$ between adjacent heat exchangers 84' rather than using the overflow system illustrated in FIGS. 7 and 8. This arrangement is particularly desirable with the loop feed system where some of the brine is flowing from a chamber of relatively low pressure to a chamber of relatively high pressure.

Figure 16:
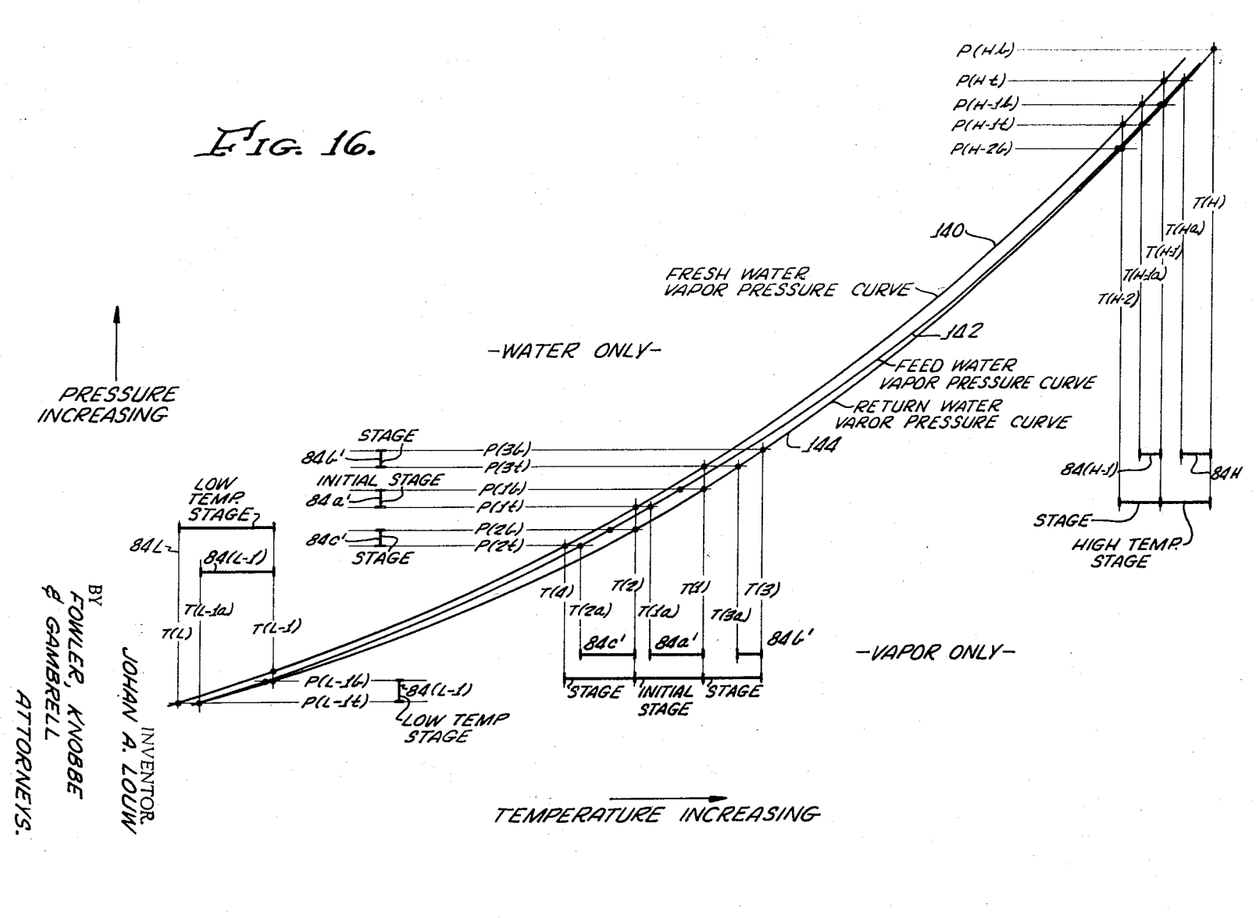
FIG. 16 is a graphical representation of the fresh water and brine vapor pressure curves showing representative pressures and temperatures of an exemplary element of the type illustrated in FIG. 13; and, FIG. 17 is a schematic representation of a compound system combining a straight line system of the type illustrated in FIGS. 5–12 with a loop system of the type illustrated in FIGS. 13–16.

Referring now to the vapor pressure curves of FIG. 16, the upper curve 140 represents the condensation temperature of fresh water, the middle curve 142 represents the boiling temperature of an exemplary brine in the feed subchambers 134, and the lower curve 144 represents the boiling temperature of the more saline brine in the return subchambers 136.

Sea water enters the feed subchamber 134 of the initial heat exchanger 84a' through the feed riser 42' at a temperature of about T(1), which is about the temperature of the ambient sea water 12. Vapor enters the condensation chamber 88' of the initial heat exchanger 84a' from the next higher temperature heat exchanger 84c' through the conduit 100'. The pressure in the condensate chamber of the initial heat exchanger 84a' is P(3t) so that vapor condenses at temperature T(1). The top of the layer of brine in the initial brine feed subchamber 134 is kept at a pressure of about P(1t) and the bottom is at about P(1b) so that all of the sea water in the initial feed subchamber 134 boils at less than T(1) (see curve 142) and is boiled by the vapor condensing in the chamber 88' of the initial heat exchanger 84a'.

The vapor from the initial heat exchanger 84a' leaves that exchanger at pressure P(1t) and a temperature somewhere between T(1) and T(1a). It passes into the condensate chamber 88' of the next lower temperature heat exchanger 84b' which is also at pressure P(1t) since it is in open communication with the brine chamber 86a'. The vapor condenses in the exchanger 84b' at pressure P(1t) and temperature T(2) to boil the brine in the feed subchamber of that heat exchanger which is kept at P(2b) at the bottom and P(2t) at the top. The process continues in the direction of the lowest temperature heat exchanger 84L in much the same manner as described above with reference to FIG. 12. Vapor enters the condensate chamber of the lowest temperature heat exchanger 84L from the exchanger 84(L–1) at about pressure P(L–1t) and condenses at about T(L). The heat of condensation is absorbed by the evaporating refrigerant, and transferred by the heat pump to the highest temperature heat exchanger where it is given off at a temperature at least as high as T(H).

The unevaporated brine flows from the feed subchamber 134 to the return subchamber 136 of the heat exchanger 84(L–1). In each heat exchanger the pressure at the top and bottom of the brine in the return subchamber 136 is the same as that of the brine in the feed subchamber 134. Comparison of the vapor pressure curves 142 and 144 shows that the more saline brine in each return subchamber 136 has a higher boiling temperature than that in the feed subchamber 134 of the same exchanger even though the pressures are the same. However, as is evident from the curve 142, the brine in the return subchamber of the exchanger 84(L–1) will boil at less than T(L–1) since the maximum pressure is P(L–1b). Thus, the brine in the return subchamber of the heat exchanger 84(L–1), as well as that in the feed subchamber, boils substantially throughout its depth.

The unevaporated brine from the heat exchanger 84(L–1) flows through the return subchambers 136 of the successively hotter heat exchangers to the central exchanger where it is discharged through the riser 54'. In each heat exchanger the brine in both the subchambers 134 and 136 is boiled by the vapor condensing beneath it.

Turning now to the hot end of the graph, the brine in both subchambers 134 and 136 of the highest temperature heat exchanger 84H is at about pressure J(Hb) at the bottom and P(Ht) at the top, so that substantially the entire depth of the layer is boiled by the refrigerant condensing at T(H). The water vapor from that heat exchanger 84H condenses in the second highest temperature heat exchanger 84(H–1) at temperature T(H–1) to boil the brine therein in the same manner as described for the other heat exchangers. Preferably, the operating temperature (boiling temperature of the brine) in the highest temperature heat exchanger 84H is no greater than about 50° C.

In the heat exchangers between the initial exchanger 84a' and the high temperature exchanger 84H the brine flows from the feed riser 42' through the feed subchamber 134 of the initial heat exchanger 84a', through the feed subchambers of the successively hotter exchangers to the high temperature exchanger 84H. There the unevaporated brine portion passes to the return subchamber 136 and back through the return subchambers of successively cooler exchangers to the discharge riser 54'. In each heat exchanger substantially the entire depth of the brine layer in both subchambers 134 and 136 is boiled by the condensing vapor beneath it, the vapor having flowed from the next hotter heat exchanger.

Thus, in the process illustrated in FIGS. 13–16, the basic method of boiling brine in all but the highest temperature stage by condensing vapor from the next hotter stage is similar to that of the process illustrated in FIGS. 5–12. However, the brine in the highest temperature stage is boiled by heat transferred by a heat pump from the condensation of vapor in the lowest temperature stage, and the condensate and brine leave at an intermediate temperature stage. Further, by way of example, the graph of FIG. 16 is illustrated using a uniform pressure increment in each layer, and therefore a uniform depth of brine in each heat exchanger.

Preferably, the boiling temperature T(1) in the initial stage and the condensate and brine discharge temperatures are within about 10° C. of the temperature of the ambient sea water 12, i.e., the body of water from which the feed is taken. By properly selecting the feed and discharge temperatures within this range, the other inherent heat losses and gains throughout the system e.g., heat gain in the heat pump compressor 96, heat loss from conduction through the housing walls 130, etc., can be offset to achieve a heat balance for the system without adding or removing heat intentionally. Otherwise, heat can be added or removed in conventional ways to achieve a heat balance.

The temperature T(L) of the lowest temperature heat exchanger 84L should be above the freezing temperature of the condensate. A further practical limit is the amount of vacuum which must be pulled to boil water at the very low temperatures. If the number of stages and the temperature drop between stages is held constant, the condensate discharge temperature varies with the feed water temperature. This should be taken into consideration in designing the process so that the low temperature heat exchanger 84L will not freeze even with the coldest anticipated feed water. Designing for a lowest temperature of, for example, about 5° C. generally gives an adequate safety factor.

The preferred overall temperature range, i.e., T(H)–T(L), is largely an economic consideration as the efficiency of the heat pump decreases with increasing range, while the number of stages, and therefore the capacity, increases with increasing range. Calculations for one exemplary embodiment show an overall temperature range of 20–25° C. to be optimum.

While the embodiment of FIGS. 13–16 has been specifically described with reference to a double loop system, it should be understood that either of the loops, i.e., the loop which is colder than feed water, or the loop which is warmer than feed water, can be used individually, and yet a heat balance can be achieved.

Figure 17:
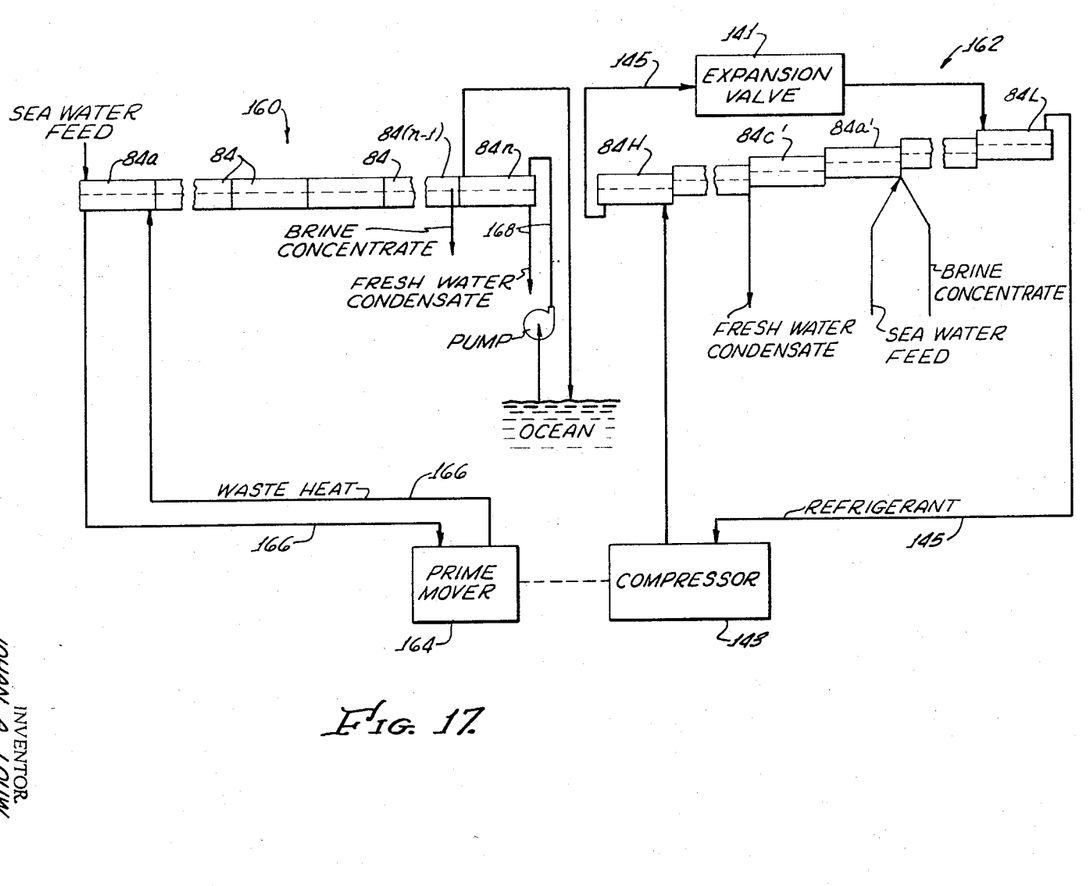

Referring now to the schematic diagram of FIG. 17, the straight line system 160 of the type illustrated in FIGS. 5–12 is shown combined with a double loop system 162 of the type illustrated in FIGS. 13–16 to form a compound system.

In the double loop portion of the compound system the sea water is fed to an initial heat exchanger 84a' and the brine concentrate is removed, for example, from the same heat exchanger. The fresh water condensate, however, is removed from a slightly higher temperature heat exchanger (for example about 2° C. higher) 84c' in order to balance the net inherent heat gains in the system. The compressor 143 and expansion valve 141 of the heat pump are connected to transfer heat from the low temperature heat exchanger 84L to the high temperature exchanger 84H.

In the straight line portion 160 of the compound system, the sea water is fed to the highest temperature heat exchanger 84a, the brine concentrate is removed from the second last heat exchanger 84(n–1), and the fresh water condensate is removed from the low temperature heat exchanger 84n.

The prime mover 164 which drives the heat pump compressor 143 and necessary pumps gives off a substantial amount of waste heat. This waste heat is used to heat the feed water, e.g., by water flowing through the conduits 166 which are in heat exchange relationship with the prime mover 164 and the first heat exchanger 84a of the straight line system 160. Thus, the waste heat of the double loop system is put to work in the straight line system affording further economies.

The vapor is condensed in the last heat exchanger 84n of the straight line system by ocean water pumped through conduits 168 and through the heat exchanger 84n.

Many features of the two exemplary embodiments can be interchanged within the broad teaching of my invention as will be apparent to those skilled in the art. It is intended that my invention should be limited only in accordance with the following claims.

I claim:

1. A method of converting saline water to fresh water comprising:
   (a) feeding saline water to the first of a plurality of partially evacuated chambers each having a plurality of spaced heat-conductive members extending interior thereof, regulating the flow of saline water to form a shallow horizontal layer of saline water with the major portion of the depth of the saline water in contact with the heat-conductive members, and regulating the pressure in said chamber such that the saline water boils at less than about 50° C.;
   (b) heating the shallow horizontal layer of saline water to boil the major portion of the water which is in contact with the heat-conductive members;
   (c) conducting the water vapor from the first chamber to a second one of the chambers of about the same pressure as the first chamber;
   (d) passing a portion of the unevaporated brine from the first chamber to a third one of the chambers, regulating the flow of saline water to form a shallow horizontal layer with the major portion of the depth of the layer in contact with the heat-conductive members, and regulating the pressure in the third chamber such that the major portion of the saline water which is in contact with the heat-conductive members is boiling water;
   (e) conducting the water vapor from the third chamber to a fourth one of the chambers;
   (f) condensing the water vapor in the fourth chamber; and
   (g) recovering the condensate and spent brine from the chambers.

2. A method of converting saline water to fresh water comprising:
   (a) feeding saline water to the first of a plurality of partially evacuated chambers, the pressure in said chamber being such that the saline water boils at less than about 50° C.;
   (b) heating the saline water to boil at least a portion thereof;
   (c) conducting the water vapor from the first chamber to a second one of the chambers of about the same pressure as the first chamber;
   (d) passing brine to a third one of the chambers in heat exchange relationship with the second chamber, the pressure in the third chamber being such that at least a portion of the saline water therein boils at a temperature no greater than the condensation temperature of the vapor in the second chamber;
   (e) conducting the water vapor from the third chamber to a fourth one of the chambers;
   (f) condensing the water vapor in the fourth chamber;
   (g) recovering the condensate and spent brine from the chambers; and
   (h) regulating the temperature of the condensate recovered, and the spent brine discharged so that the temperature of the water fed to the system, the temperature of the condensate recovered, and the temperature of the spent brine discharged are all within about 10° C. of each other and selected to substantially eliminate the addition of heat to the system from external source and extraction of heat from the system to an external medium.

3. A method of converting saline water to fresh water in accordance with claim 2 and further comprising the steps of splitting the saline water in two loops as it is fed to the system each loop including a plurality of series-connected heat exchangers leading to a common recovery location, and regulating the pressures in said loops so that the water in the greatest portion of one loop boils at above the feed water temperature, and the water in the greatest portion of the other loop boils at below the feed water temperature.

4. A method of converting saline water to fresh water in accordance with claim 2 and further comprising the steps of:
   (a) heating the saline water in the highest pressure chamber by condensing refrigerant of a heat pump in heat exchange relationship therewith; and,
   (b) condensing the water vapor in the lowest pressure chamber by evaporating the heat pump refrigerant in heat exchange relationship therewith.

5. A method of converting saline water to fresh water in accordance with claim 4 and further comprising the step of:
   (a) using waste heat from a prime mover of the heat pump compressor to add heat to a separate converter;
   (b) feeding saline water to the first of a plurality of partially evacuated chambers of said separate converter, and regulating the pressure in said chamber such that the saline water boils at less than about 50° C., said first chamber being the brine chamber of the highest temperature heat exchanger;
   (c) heating the saline water to evaporate at least a portion thereof;
   (d) conducting the water vapor from the first chamber to a second one of the chambers of about the same pressure as the first chamber;
   (e) passing a portion of the unevaporated brine from the first chamber to a third one of the chambers in heat exchange relationship with the second chamber, and regulating the pressure in the third chamber such that at least a portion of the saline water therein boils at a temperature no greater than the condensation temperature of the vapor in the second chamber;
   (f) conducting the water vapor from the third chamber to a fourth one of the chambers;
   (g) condensing the water vapor in the fourth chamber;
   (h) recovering the condensated spent brine from the chambers; and
   (i) removing the spent brine from the apparatus at a heat exchanger near the low temperature end.

6. Apparatus for converting saline water to fresh water including a heat exchanger comprising:
   (a) means defining a chamber for a shallow layer of saline water with the liquid vapor interface of the saline water generally horizontal;
   (b) heat transfer means for conducting heat from water vapor condensing exterior of the chamber to saline water in the chamber, said heat transfer means including a plurality of spaced-apart heat conductive members extending interior of the chamber through the major portion of the depth of the saline water; and,
   (c) means regulating the pressure of the condensing vapor and the saline water in relation to the depth of the saline water to regulate their condensing and boiling temperatures respectively so that the major portion of the surface of said heat conductive members is in contact with boiling water.

7. Apparatus for converting saline water to fresh water including a plurality of heat exchangers each constructed in accordance with claim 6, and further comprising:
   (a) means defining a chamber for condensing vapor in heat exchanger relationship with each of the saline water chambers; and,
   (b) means serially connecting the heat exchangers to deliver the vapor generated in a saline water chamber to the condensation chamber of the next heat exchanger.

8. Apparatus for converting saline water to fresh water in accordance with claim 7 wherein said heat transfer means are arranged so as to be substantially coextensive with the depth of the layer of saline water and so that substantially all of their surface is in contact with water which boils at about or slightly below the condensation temperature of the condensing vapor.

9. Apparatus for converting saline water to fresh water in accordance with claim 8 and further comprising means for regulating the depth of the saline water in the chamber so as to be less than about 2 inches deep.

10. Apparatus for converting saline water to fresh water in accordance with claim 8 wherein:
 (a) each vapor condensation chamber is beneath the saline water chamber of the same heat exchanger; and,
 (b) said heat conductive members are a plurality of elongate, laterally spaced ridges extending upward from the bottom of the saline water to about the liquid vapor interface of the saline water.

11. Apparatus for converting saline water to fresh water in accordance with claim 10 wherein the heat transfer means further includes a plurality of elongate, laterally spaced ridges extending downward into the condensation chamber.

12. Apparatus for converting saline water to fresh water in accordance with claim 8 and further comprising:
 (a) means communicating the vapor area in the condensation chamber in open connection with the vapor area of the saline water chamber from which it receives its vapor;
 (b) means conducting the saline water serially through the saline water chambers; and,
 (c) the pressure regulating means including means maintaining a pressure drop between each saline water chamber and the saline water chamber which its vapor heats.

13. Apparatus for converting saline water to fresh water in accordance with claim 8 further comprising partition means dividing the saline water chamber into two elongate parallel sub-chambers for receiving water flowing in opposite directions.

14. Multiple effect distillation apparatus for converting sea water to fresh water comprising:
 (a) a plurality of heat exchangers having graduated operating temperatures, the lowest temperature heat exchanger having a fresh water condensate chamber, the highest temperature heat exchanger having a brine chamber, and each intermediate temperature heat exchanger having a condensate chamber and a brine chamber, each brine chamber having a plurality of spaced-apart heat-conductive members extending into the lower portion of the chamber;
 (b) means for feeding a shallow horizontal layer of sea water to the brine chambers and for regulating the depth of the layer so that the major portion of the depth of the saline water is in contact with said heat conductive members;
 (c) means for boiling the shallow horizontal layer of water in each brine chamber and condensing water vapor in each condensate chamber;
 (d) means for regulating the pressure in said chambers so that the vapor in each intermediate heat exchanger condenses at a temperature high enough to boil the major portion of the saline water layer which is in contact with said heat-conductive members in the same heat exchanger, and so that the boiling temperature of the saline water in the highest temperature brine chamber is less than about 50° C.;
 (e) means for removing fresh water condensate from said condensate chambers; and,
 (f) means for removing brine concentrate from said brine chambers.

15. Multiple effect distillation apparatus for converting sea water to fresh water in accordance with claim 14 wherein the pressure regulating means maintains the pressure in the lowest temperature condensate chamber sufficiently low that the vapor therein condenses at a temperature of about 0–5° C.

16. Multiple effect distillation apparatus for converting sea water to fresh water in accordance with claim 14 wherein:
 (a) the means for feeding sea water initially feeds the water to the apparatus at the brine chamber of the highest temperature heat exchanger; and,
 (b) the means for removing brine concentrate is connected to the apparatus at a heat exchanger near the low temperature end.

17. Multiple effect distillation apparatus for converting sea water to fresh water in accordance with claim 14 wherein the pressure regulating means maintains the pressure in the lowest temperature condensate chamber so that the vapor therein condenses at above but close to the ambient sea water temperature.

18. Multiple effect distillation apparatus for converting sea water to fresh water in accordance with claim 24 wherein:
 (a) said initial subchamber and said final subchamber are in intermediate heat exchangers and the brine flows in two loops from said initial subchamber to each extreme temperature heat exchanger and back to the final brine chamber;
 (b) the pressure regulating means maintains the pressure in the initial subchamber so that the brine boils at within about 10° C. of the ambient sea water temperature;
 (c) the pressure regulating means maintains the pressure in the condensate chamber of the lowest temperature heat exchanger sufficiently low that the vapor therein condenses at less than the ambient sea water temperature; and,
 (d) the pressure regulating means maintains the pressure in the brine chamber of the highest temperature heat exchanger such that the boiling temperature of the brine therein exceeds the ambient sea water temperature.

19. Multiple effect distillation apparatus for converting sea water to fresh water in accordance with claim 24 wherein the temperature of the sea water in the initial and final subchambers, and the temperature of the condensate removed from the system are all within about 10° C. of the ambient sea water temperature and are selected to substantially eliminate the need for addition of heat to the apparatus from an external source.

20. Multiple effect distillation apparatus for converting sea water to fresh water in accordance with claim 19 wherein the means for cooling water vapor in the lowest temperature condensate chamber and boiling brine in the highest temperature brine chamber includes a heat pump having its evaporator and condenser in heat exchange relationship with said condensate and brine chambers respectively.

21. Multiple effect distillation apparatus for converting sea water to fresh water in accordance with claim 20 in combination with a second multiple effect distillation apparatus comprising:
 (a) a plurality of heat exchangers having graduated operating temperatures, the lowest temperature heat exchanger having a fresh water condensate chamber, the highest temperature heat exchanger having a brine chamber, and each intermediate temperature heat exchanger having a condensate chamber and a brine chamber;
 (b) means for feeding sea water to the brine chamber of the highest temperature heat exchanger;
 (c) means for boiling water in each brine chamber and condensing water vapor in each condensate chamber;

(d) in at least the intermediate heat exchangers said boiling and condensing means including means for transferring heat from the condensing vapor to the boiling brine;

(e) means for regulating the pressure in said chambers so that the vapor in each intermediate heat exchanger condenses at a temperature high enough to boil at least a portion of the saline water in the same heat exchanger, and so that the boiling temperature of the saline water in the highest temperature brine chamber is less than about 50° C.;

(f) means for removing fresh water condensate from said condensate chambers;

(g) means for removing brine concentrate from the brine chamber of a heat exchanger near the low temperature end; and (h) the heat pump of the first apparatus having a prime mover arranged so that waste heat therefrom is used for heating saline water in the second apparatus.

22. A desalination plant comprising:
(a) a barge adapted to float in a body of water feeding the plant, the barge having a feed water tank, a fresh water condensate tank, and a brine concentrate tank;
(b) a plurality of generally parallel desalination elements;
(c) means for supporting said elements substantially above the body of water and above said tanks when the barge is floating;
(d) means for feeding saline water from the feed water tank to the elements;
(e) means for delivering fresh water concentrate from the elements to the condensate tank;
(f) means for delivering concentrated brine from the elements to the brine tank;
(g) means on the barge for containing water to float the tanks; and,
(h) means for adjusting the level of said water to adjust the defference in elevation between the tanks and the elements.

23. A method of converting saline water to fresh water in accordance with claim 1 wherein the steps of regulating the pressure in the first and third chamber further comprise regulating the pressure such that substantially the entire layer of saline water in each of said first and third chambers boils.

24. Multiple effect distillation apparatus for converting sea water to fresh water comprising:
(a) a plurality of heat exchangert having graduated operating temperatures, the lowest temperature heat exchanger having a fresh water condensate chamber, the highest temperature heat exchanger having a brine chamber, and each intermediate temperature heat exchanger having a condensate chamber and a brine chamber;

(b) means dividing each of said brine chambers into a supply subchamber and a return subchamber;

(c) means for feeding a shallow horizontal layer of sea water to the initial supply subchamber;

(d) means connecting said subchambers for conducting brine from the initial subchamber through the other supply subchambers to an extreme temperature heat exchanger and through the return subchambers to a final return subchamber;

(e) means for boiling the shallow horizontal layer of water in each brine subchamber and condensing water vapor in each condensate chamber;

(f) in at least the intermediate heat exchangers said boiling and condensing means including means for transferring heat from the condensing vapor to the boiling brine;

(g) means for regulating the pressures in said chambers so that the vapor in each intermediate heat exchanger condenses at a temperature high enough to boil at least a portion of the saline water in the same heat exchanger, and so that the boiling temperature of the saline water in the highest temperature brine chamber is less than about 50° C.;

(h) means for removing fresh water condensate from said condensate chambers; and (i) means for removing brine concentrate from the final return subchamber.

References Cited

UNITED STATES PATENTS

| | | | |
|---|---|---|---|
| 2,006,985 | 7/1935 | Claude et al. | 203—10 |
| 2,716,446 | 8/1955 | Ross | 203—10 |
| 3,004,590 | 10/1961 | Rosenblad | 202—174 |
| 3,015,613 | 1/1962 | Edmondson | 203—10 |
| 3,095,923 | 7/1963 | Foutz | 165—164 |
| 3,146,177 | 8/1964 | Chalmers et al. | 202—173 |
| 3,213,001 | 10/1965 | Schmidt | 202—173 |
| 3,234,109 | 2/1966 | Lustenader | 203—11 |
| 3,275,530 | 9/1966 | Akers | 202—174 |
| 3,282,797 | 11/1966 | Hammer | 203—11 |
| 3,284,318 | 11/1966 | Ceanda et al. | 203—11 |
| 3,307,614 | 3/1967 | Rosenblad | 159—28 |
| 3,322,648 | 5/1967 | Kays et al. | 202—174 |
| 3,347,753 | 10/1967 | Morse | 203—11 |
| 3,357,898 | 12/1967 | Novakovich | 203—10 |
| 3,360,442 | 12/1967 | Starmer | 202—173 |

WILBUR L. BASCOMB, JR., *Primary Examiner.*

U.S. Cl. X.R.

114—.5; 159—28; 165—166; 202—172, 173, 174, 181, 235, 236, 237; 203—22, 25, 77, 89, 100